United States Patent [19]

Carpenter et al.

[11] Patent Number: 6,067,603
[45] Date of Patent: May 23, 2000

[54] NON-UNIFORM MEMORY ACCESS (NUMA) DATA PROCESSING SYSTEM THAT SPECULATIVELY ISSUES REQUESTS ON A NODE INTERCONNECT

[75] Inventors: Gary Dale Carpenter, Pflugerville; Mark Edward Dean; David Brian Glasco, both of Austin, all of Tex.

[73] Assignee: International Business Machines Corporation, Armonk, N.Y.

[21] Appl. No.: 09/165,177

[22] Filed: Oct. 1, 1998

[51] Int. Cl.⁷ ...................................................... G06F 12/00
[52] U.S. Cl. ........................... 711/141; 711/144; 711/163; 711/167; 712/28; 710/104
[58] Field of Search ............................ 711/141–144, 163, 711/167; 712/28; 710/104

[56] References Cited

U.S. PATENT DOCUMENTS

| | | | |
|---|---|---|---|
| 5,530,933 | 6/1996 | Frink et al. | 711/141 |
| 5,603,010 | 2/1997 | Dodd et al. | 711/167 |
| 5,623,628 | 4/1997 | Brayton et al. | 711/141 |
| 5,673,413 | 9/1997 | Deshpande et al. | 711/141 |
| 5,835,950 | 11/1998 | Cho et al. | 711/144 |
| 5,940,864 | 8/1999 | Arimilli et al. | 711/163 |

*Primary Examiner*—John A. Follansbee
*Assistant Examiner*—Nabil El-Hady
*Attorney, Agent, or Firm*—Casimer K. Salys; Brian F. Russell; Andrew J. Dillon

[57] ABSTRACT

A computer system includes a node interconnect to which at least a first processing node and a second processing node are coupled. The first and the second processing nodes each include a local interconnect, a processor coupled to the local interconnect, a system memory coupled to the local interconnect, and a node controller interposed between the local interconnect and the node interconnect. In order to reduce communication latency, the node controller of the first processing node speculatively transmits request transactions received from the local interconnect of the first processing node to the second processing node via the node interconnect, where each such request transaction specifies an associated datum. The node controller of the second processing node handles each speculatively transmitted request transaction received in response to a directory state of its associated datum.

16 Claims, 5 Drawing Sheets

NON-UNIFORM MEMORY ACCESS (NUMA) DATA PROCESSING SYSTEM THAT SPECULATIVELY ISSUES REQUESTS ON A NODE INTERCONNECT

BACKGROUND OF THE INVENTION

1. Technical Field

The present invention relates in general to a method and system for data processing and, in particular, to a non-uniform memory access (NUMA) data processing system and method of communication in a NUMA data processing system. Still more particularly, the present invention relates to a NUMA data processing system and method of communication in which certain requests are speculatively issued on a node interconnect in order to reduce communication latency.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

A principal performance concern with CC-NUMA computer systems is the relatively high latency associated with communication transactions transmitted via the interconnect coupling the nodes. Because all data accesses can potentially trigger a coherency or data request transaction on the nodal interconnect, the latency associated with the transmission of requests to remote nodes and transmission of the responses from the remote nodes can dramatically influence overall system performance. As should thus be apparent, it would be desirable to provide a CC-NUMA computer system having low inter-node communication latency.

SUMMARY OF THE INVENTION

A computer system includes a node interconnect to which at least a first processing node and a second processing node are coupled. The first and the second processing nodes each include a local interconnect, a processor coupled to the local interconnect, a system memory coupled to the local interconnect, and a node controller interposed between the local interconnect and the node interconnect. In order to reduce communication latency, the node controller of the first processing node speculatively transmits request transactions received from the local interconnect of the first processing node to the second processing node via the node interconnect, where each such request transaction specifies an associated datum. The node controller of the second processing node handles each speculatively transmitted request transaction received in response to a directory state of its associated datum.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
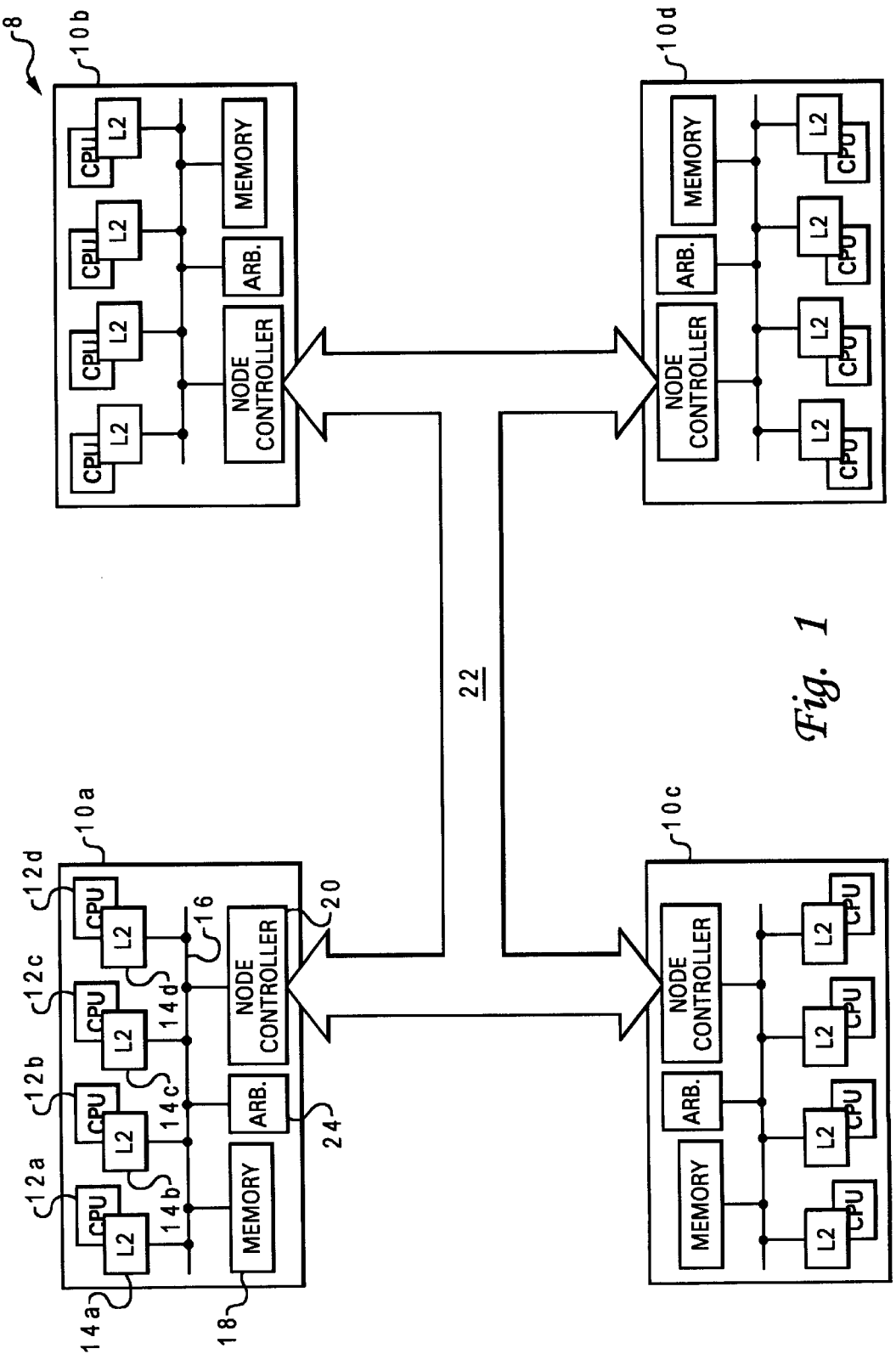
FIG. 1 depicts an illustrative embodiment of a NUMA computer system with which the present invention may advantageously be utilized.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 8 includes a number (N) of processing nodes 10a–10d, which are interconnected by node interconnect 22. Processing nodes 10a–10d each include at least one, and up to M, processors 12. Processors 12a–12d are preferably identical and may comprise a processor within the PowerPC™ line of processors available from International Business Machines (IBM) Corporation of Armonk, N.Y. In addition to the registers, instruction flow logic and execution units utilized to execute program instructions, each of processors 12a–12d also includes an on-chip level one (L1) cache (not illustrated), which together with a respective one of level two (L2) caches 14a–14d is utilized to stage data to the associated processor 12 from system memories 18. In other words, the L1 caches and L2 caches 14a–14d function as intermediate storage between the system memories 18 and processors 12 that temporarily buffer data that are likely to be accessed by the associated processor 12. L2 caches 14 typically have a much larger storage capacity than the L1 caches, but at a longer access latency. For example, L2 caches 14a–14d may have a storage capacity of 1–16 megabytes (MB), while the on-chip L1 caches may have a storage capacity of 8–32 kilobytes. Although L2 caches 14a–14d are illustrated in FIG. 1 as external to processors 12, it should be understood that L2 caches 14a–14d could alternatively be incorporated within the associated processor 12 to provide additional on-chip data storage. In the following discussion, each processor 12 and its associated cache hierarchy (L1, L2, etc.) is considered to be a single snooper.

As shown, processing nodes 10a–10d further include a respective node controller 20, which, together with system memory 18 and L2 caches 14a–14d, is coupled to local interconnect 16. Each node controller 20 serves as a local agent for remote processing nodes 10 by performing at least two functions. First, each node controller 20 snoops the associated local interconnect 16 and facilitates the transmission of local communication transactions to remote processing nodes 10. Second, each node controller 20 snoops communication transactions on node interconnect 22 and masters relevant communication transactions on the associated local interconnect 16. Communication on each local interconnect 16 is controlled by an arbiter 24. As discussed further below, arbiters 24 regulate access to local interconnects 16 based on request signals generated by processors 12 and compile coherency responses for snooped communication transactions on local interconnects 16.

Of course, NUMA computer system 8 can further include additional devices that are not necessary for an understanding of the present invention and are accordingly omitted in order to avoid obscuring the present invention. For example, each node 10 may also support I/O devices (e.g., a display device, keyboard, or graphical pointer), non-volatile storage for storing an operating system and application software, and serial and parallel ports for connection to networks or attached devices.

Memory Organization

All of processors 12 in NUMA computer system 8 share a single physical memory space, meaning that each physical address is associated with only a single location in one of system memories 18. Thus, the overall contents of the system memory, which can generally be accessed by any processor 12 in NUMA computer system 8, can be viewed as partitioned between the four system memories 18. For example, for the illustrative embodiment of the present invention shown in FIG. 1, processors 12 address a 16 gigabyte (GB) address space including both a general purpose memory area and a reserved area. The general purpose memory area is divided into 500 MB segments, with each of the four processing nodes 10 being allocated every fourth segment. The reserved area, which may contain approximately 2 GB, includes system control and peripheral memory and I/O areas that are each allocated to a respective one of processing nodes 10.

For purposes of the present discussion, the processing node 10 that stores a particular datum in its system memory 18 is said to be the home node for that datum; conversely, others of processing nodes 10–10d are said to be remote nodes with respect to the particular datum.

Memory Coherency

Because data stored within each system memory 18 can be requested, accessed, and modified by any processor 12 within NUMA computer system 8, NUMA computer system 8 implements a cache coherency protocol to maintain coherency both between caches in the same processing node and between caches in different processing nodes. Thus, NUMA computer system 8 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that L1 caches, L2 caches 14b, and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

Interconnect Architecture

Local interconnects 16 and node interconnect 22 can each be implemented with any broadcast or point-to-point interconnect architectures, for example, a bus or cross-bar. However, in a preferred embodiment, at least node interconnect 22 is implemented as a switch-based non-broadcast, packet-based interconnect. In the preferred embodiment, the interconnect is an in-order interconnect. Local interconnects 16 permits split transactions, meaning that no fixed timing relationship exists between the address and data tenures comprising a communication transaction and that data packets can be ordered differently than the associated address packets. The node interconnect 22 has three prioritized, ordered virtual channels: address, data and response. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Regardless of the type or types of interconnect architecture that are implemented, at least three types of "packets" (packet being used here generically to refer to a discrete unit of information)—address, data, and coherency response—are utilized to convey information between processing nodes 10 via node interconnect 22 and between snoopers via local interconnects 16. Referring now to Tables I and II, a summary of relevant fields and definitions are given for address and data packets, respectively.

TABLE I

| Field Name | Description |
| --- | --- |
| Address <0:7> | Address bus modifiers defining attributes of a communication transaction for coherency, write thru, and protection |
| Address <8:15> | Tag used to identify a communication transaction |
| Address <16:63> | Address that inidicates the physical, virtual or I/O address in a request |
| AParity <0:2> | Indicates parity for address bits <0:63> |
| TDescriptors | Indicates size and type of communication transaction |

TABLE II

| Field Name | Description |
| --- | --- |
| Data <0:127> | Data for read and write transactions |
| Data parity <0:15> | Indicates parity for data lines <0:127> |
| DTag <0:7> | Tag used to match a data packet with an address packet |
| DValid <0:1> | Indicates if valid information is present in Data and DTag fields |

As indicated in Tables I and II, to permit recipients to determine the communication transaction to which each packet belongs, each packet in a communication transaction is identified with a transaction tag. This tagging of packets allows for the split address and data tenures described earlier. Those skilled in the art will appreciate that additional flow control logic and associated flow control signals may be utilized to regulate the utilization of the finite communication resources.

Within each processing node 10, coherency responses are communicated between each snooper and the local arbiter 24. The signal lines within local interconnects 16 that are utilized for coherency communication are summarized below in Table III.

TABLE III

| Signal Name | Description |
| --- | --- |
| AStatOut <0:1> | Encoded signals asserted by each bus receiver to indicate flow control or error information to arbiter |
| AStatIn <0:1> | Encoded signals asserted by arbiter in response to tallying the AStatOut signals asserted by the bus receivers |
| ARespOut <0:2> | Encoded signals asserted by each bus receiver to indicate coherency information to arbiter |
| ARespIn <0:2> | Encoded signals asserted by arbiter in response to tallying the ARespOut signals asserted by the bus receivers |

Coherency responses transmitted via the AResp and AStat lines of local interconnects 16 preferably have a fixed but programmable timing relationship with the associated address packets. For example, the AStatOut votes, which provide a preliminary indication of the response of each snooper to an address packet on local interconnect 16, may be required in the second cycle following receipt of the address packet. Arbiter 24 compiles the AStatOut votes and then issues the AStatIn vote a fixed but programmable number of cycles later (e.g., 1 cycle). Possible AStat votes are summarized below in Table IV.

TABLE IV

| AStat vote | Meaning |
| --- | --- |
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed in Table V.

TABLE V

| Coherency responses | Meaning |
| --- | --- |
| Retry | Source of request must retry transaction usually for flow control reasons |
| Modified intervention | Line is modified in cache and will be sourced to requestor |
| Shared | Line is held shared in cache |
| Null | Line is invalid in cache |
| ReRun | Snooped request has long latency and source of request will be instructed to reissue transaction at a later time |

The ReRun AResp vote, which is usually issued by a node controller 20, indicates that the snooped request has a long latency and that the source of the request will be instructed to reissue the transaction at a later time. Thus, in contrast to a Retry AResp vote, a ReRun makes the recipient of a transaction that voted ReRun (and not the originator of the transaction) responsible for causing the communication transaction to be reissued at a later time.

In accordance with the present invention and as discussed in detail below, inter-node communication latency is improved through the speculative issue of certain requests (e.g., read requests for which the requesting node is not the home node) on node interconnect 22 at least prior to the ARespIn period (and preferably prior to the AStatIn period) at the requesting processing node 10. In order to support speculative issue of requests on node interconnect 22, three different coherency packets are transmitted from the requesting processing node 10 to the target processing node 10 for each address packet. First, when the speculative request is issued on node interconnect 22, a special request packet with a speculative AResp vote is transmitted to the target processing node 10 to indicate that the request was issued speculatively. Thereafter, the AStatIn and ARespIn votes received by the request transaction at the source processing node 10 are individually forwarded to the target processing node 10.

Node Controller

Figure 2:
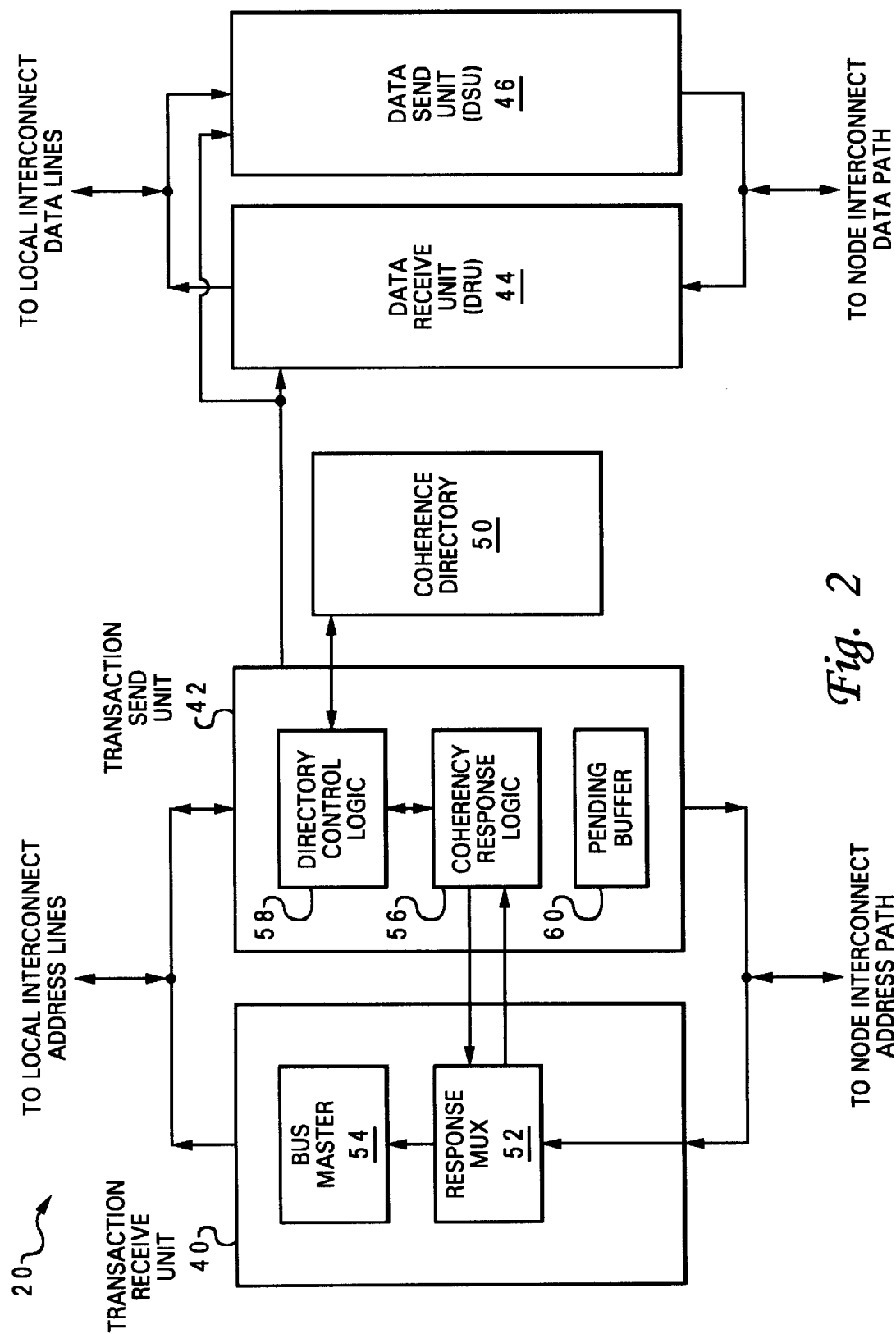
FIG. 2 is a more detailed block diagram of the node controller shown in FIG. 1.

Referring now to FIG. 2, there is illustrated a more detailed block diagram of a node controller 20 in NUMA computer system 8 of FIG. 1. As shown in FIG. 2, each node controller 20, which is coupled between a local interconnect 16 and node interconnect 22, includes a transaction receive unit (TRU) 40, a transaction send unit (TSU) 42, a data receive unit (DRU) 44, and a data send unit (DSU) 46. TRU 40, TSU 42, DRU 44 and DSU 46 can be implemented, for example, with field programmable gate arrays (FPGAs) or application specific integrated circuits (ASICs). As indicated, the address and data paths through node controller 20 are bifurcated, with address packets being processed by TRU 40 and TSU 42 and data packets being processed by DSU 44 and DRU 46.

TRU 40, which is so designated to indicate transaction flow off of node interconnect 22, is responsible for accepting address and coherency packets from node interconnect 22, issuing transactions on local interconnect 16, and forwarding responses to TSU 42. TRU 40 includes response multiplexer (mux) 52, which receives packets from node interconnect 22 and passes selected packets to both bus master 54 and coherency response logic 56 within TSU 42. In response to receipt of a address packet from response multiplexer 52, bus master 54 can initiate a communication transaction on its local interconnect 16 that is the same as or different from the received address packet.

TSU 42, which as indicated by its nomenclature is a conduit for transactions flowing onto node interconnect 22, includes a multiple-entry pending buffer 60 that temporarily stores attributes of communication transactions sourced onto node interconnect 22 that have yet to be completed. The transaction attributes stored in an entry of pending buffer 60 preferably include at least the address (including tag) of the transaction, the type of the transaction, and the number of expected coherency responses. Each pending buffer entry has an associated status, which can be set either to Null, indicating that once all responses are received that the pending buffer entry can be deleted, or to ReRun, indicating that indicating that TSU 42 should instruct TRU 40 to issue a ReRun request for the held tag once all responses are received. In addition to sourcing address packets on node interconnect 22, TSU 42 interacts with TRU 40 to process memory request transactions and issues commands to DRU 44 and DSU 46 to control the transfer of data between local interconnect 16 and node interconnect 22. TSU 42 also implements the selected (i.e., MSI) coherency protocol for node interconnect 22 with coherency response logic 56 and maintains coherence directory 50 with directory control logic 58.

Coherence directory 50 stores indications of the system memory addresses of data (e.g., cache lines) checked out to caches in remote nodes for which the local processing node is the home node. The address indication for each cache line is stored in association with an identifier of each remote processing node having a copy of the cache line and the coherency status of the cache line at each such remote processing node. Possible coherency states for entries in coherency directory 50 are summarized in Table VI.

TABLE VI

| Coherence directory state | Possible state(s) in local cache | Possible state(s) in remote cache | Meaning |
| --- | --- | --- | --- |
| Modified (M) | I | M, E, or I | Cache line may be modified at a remote node with repect to system memory at home node |

TABLE VI-continued

| Coherence directory state | Possible state(s) in local cache | Possible state(s) in remote cache | Meaning |
| --- | --- | --- | --- |
| Shared (S) | S or I | S or I | Cache line may be held non-exclusively at remote node |
| Invalid (I) | M, E, S, or I | I | Cache line is not held by any remote node |
| Pending-shared | S or I | S or I | Cache line is in the process of being invalidated at remote nodes |
| Pending-modified | I | M, E, or I | Cache line, which may be modified remotely, is in process of being written back to system memory at home node, possibly with invalidation at remote node. |

As indicated in Table VI, the knowledge of the coherency states of cache lines held by remote processing nodes is imprecise. This imprecision is due to the fact that a cache line held remotely can make a transition from S to I, from E to I, or from E to M without notifying the node controller 20 of the home node.

Inter-node Communication Methodology

As noted above, certain request transactions that specify an address contained in the system memory 18 within a remote processing node 10 are speculatively issued on node interconnect 22 at least prior to the ARespIn period (and preferably before the AStatIn period) at the requesting processing node 10 in order to minimize latency. The target processing node 10 of the speculative request, which is the home node of the request address, is determined by TSU 42 of requesting processing node 10, for example, by reference to compare registers, which implement the global system memory map.

The behavior of the requesting processing node 10 in handling the speculative request depends upon the outcome of the request transaction at requesting processing node 10. Three outcomes are possible: the request transaction may be effectively cancelled, the request transaction may complete cleanly (i.e., requested data is supplied by a system memory 18), or the request transaction may complete with modified intervention. The manner in which the requesting processing node 10 handles these three different cases is summarized in Table VII below.

TABLE VII

| AStat vote | ARespIN vote | Meaning | DRU command | Status of pending buffer entry |
| --- | --- | --- | --- | --- |
| Error | X | Transaction aborted | Kill | Null |
| Retry | X | Transaction aborted | Kill | Null |
| NoAck | X | Transaction aborted if Ack expected | Kill | Null |
| Ack | Null | Will not occur as the ARespReRun vote by the TSU will override any ARespOut Null votes | N/A | N/A |

TABLE VII-continued

| AStat vote | ARespIN vote | Meaning | DRU command | Status of pending buffer entry |
|---|---|---|---|---|
| Ack | Shared | Will not occur as the ARespReRun vote by the TSU will override any ARespOut Shared votes | N/A | N/A |
| Ack | ReRun | Transaction completes successfully | Receive | ReRun |
| Ack | MI | Requesting processing node will supply data to requesting snooper and home node | Send | Null |
| Ack | Retry | Transaction aborted | Kill | Null |

As shown in Table VII, if the AStatIn vote is Error or Retry or if no AStatIn Ack vote is received by TSU 42 of requesting processing node 10, the transaction is aborted regardless of what ARespIn vote is received. The transaction is similarly aborted if a Retry ARespIn vote is received by TSU 42. In these cases, DRU 44 of the requesting processing node 10 is commanded by TSU 42 to expect a data transfer, but discard (Kill) any received data and pending buffer 60 is commanded to delete the entry associated with the transaction once all responses are received. The ARespOut vote of ReRun issued by TSU 42 will override any ARespOut vote of Null or Shared by any local processor. In cases in which an Ack AStatIn vote and a ReRun ARespIn vote are received, the speculative request transaction will complete successfully, and the requested data will be supplied by the target processing node 10. Accordingly, TSU 42 commands DRU 44 to receive data from the target processing node 10 via node interconnect 22 and sets the entry in pending buffer 60 to the ReRun state to indicate that once all outstanding responses are received TRU 40 is to issue a ReRun request on local interconnect 16 of requesting processing node 10 in order to cause the requesting snooper to again issue the request transaction. In response to receipt of the reissued request transaction and the provision of the appropriate AStat and AResp votes, TSU 42 will command DRU 44 to supply the received data to the requesting snooper. Finally, if an Ack AStat vote and a Modified Intervention AResp vote are received, the requesting processing node 10 will supply the requested data to both the requesting snooper and the home node. TSU 42 therefore commands DSU 46 to send the requested data to the home node and sets the entry in pending buffer 60 associated with the transaction to the Null state to indicate that the entry is to be deleted once all outstanding responses are received.

At the home node (i.e., the target processing node 10 of the speculatively issued request transaction), coherency response logic 56 within TSU 42 utilizes the knowledge of whether the request transaction is speculative and the state of the requested data in coherence directory 50 to determine an appropriate course of action to take in response to receipt of a request transaction by TRU 40. Possible actions that may be taken by TSU 42 in response to receipt of a request transaction are summarized below in Table VIII.

TABLE VIII

| Spec. request | Dir. state | ARespIn vote | Meaning | Action |
|---|---|---|---|---|
| X | I or S | X | Line is not modified at requesting processing node | Retrieve data from local system memory |
| X | X | S | Line is not modified at requesting processing node | Retrieve data from local system memory |
| X | M BV [r] = 0 | X | Line is not modified at requesting processing node | Retrieve data from owning cache |
| N | M BV [r] = 1 | X | Line is modified at requesting processing node | Accept data from node interconnect |
| Y | M BV [r] = 1 | X | Line is possibly modified at requesting processing node | Retry transaction; TRU will auto-retry speculative transactions that are retried |

As indicated in Table VIII, if the state of the requested data in coherency directory 50 is Invalid or Shared, or if the ARespIn vote at the home node is Shared, or if the forwarded ARespIn vote has been received from the requesting processing node 10 (meaning that the request is no longer speculative) and is other than Retry, the request received by the home node can be processed in an ordinary fashion as a non-speculative request. For example, in cases in which the state of the requested cache line in the home node's coherence directory 50 is Invalid or Shared, the requested cache line is retrieved from system memory 18 at the home node and transmitted to DRU 44 of requesting processing node 10 by DSU 46 of the home node.

If the state of the cache line specified by a request transaction is indicated by coherence directory 50 as Modified, the home node's node controller 20 handles the request in one of three ways, depending upon whether or not the request transaction is speculative, if the requested cache line is held modified in a node other than the requestor's node, if the requested cache line is indicated as modified at the requestor's node, or if the request is retried at the home node. As indicated in the third row of Table VIII, if the bit vector (BV) within coherency directory 50 indicates that the cache line is held modified in a processing node 10 other than the requesting processing node 10 (i.e., a third processing node 10), then the cache line must be retrieved from the remote cache that owns the requested cache line in Modified state. Retrieving the requested cache line from the third processing node 10 entails TSU 42 of home node sourcing a non-speculative request on node interconnect 22 requesting that the third processing node 10 supply the requested cache line to the home node. Once received from the third processing node 10, the requested cache line is forwarded to requesting processing node 10 and is utilized to update system memory 18 at the home node.

Alternatively, if the requested cache line is indicated by the home node's coherence directory 50 as modified at requesting processing node 10 and the request is not speculative, TSU 42 commands DRU 44 to accept a copy of the modified cache line from requesting processing node 10. As discussed above, the home node's node controller 20 will utilize the modified cache line to update its local system memory 18. However, if the home node's coherence directory 50 indicates the requested cache line is modified at requesting node 10 and the request is speculative, the home node's TSU 42 cannot determine how to respond to the speculative request transaction since the requested cache line could be Modified or Invalid at requesting processing node 10. Accordingly, when the request transaction is sourced on the home node's local interconnect 16 by bus master 54 of TRU 40, TSU 42 retries the local transaction until the ARespIn vote at requesting processing node 10 is received, thereby rendering the request non-speculative.

The final cases of interest summarized in Table VIII occur when the ARespIn vote for the request transaction at the home node is Retry. If the request transaction is issued on the home node's local interconnect 16 and received a Retry ARespIn vote, TRU 40 will reissue the request locally if the request is speculative or if the request is non-speculative and the auto-retry bit is set in the request. Otherwise, the request will be bounced back to the requesting processing node 10.

Figure 3B:
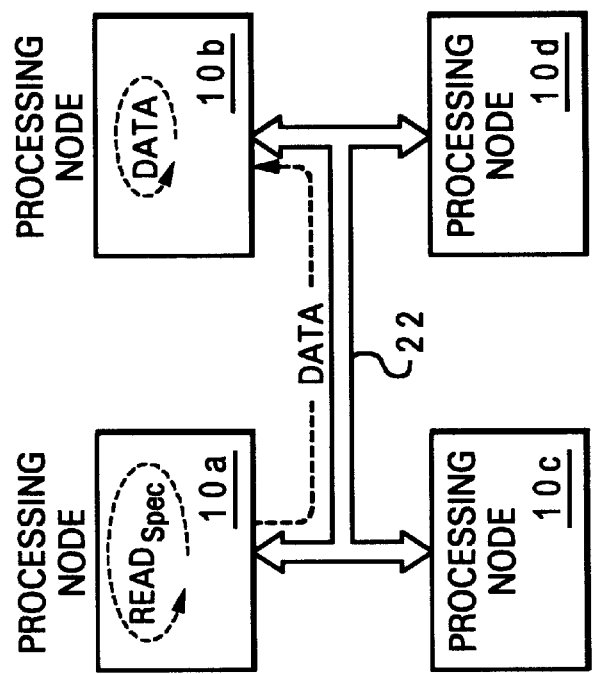
FIGS. 3A and 3B illustrate a first exemplary inter-node communication scenario in which the requesting processing node speculatively issues a read request for a cache line that is not modified at the requesting processing node.
Figure 3A:
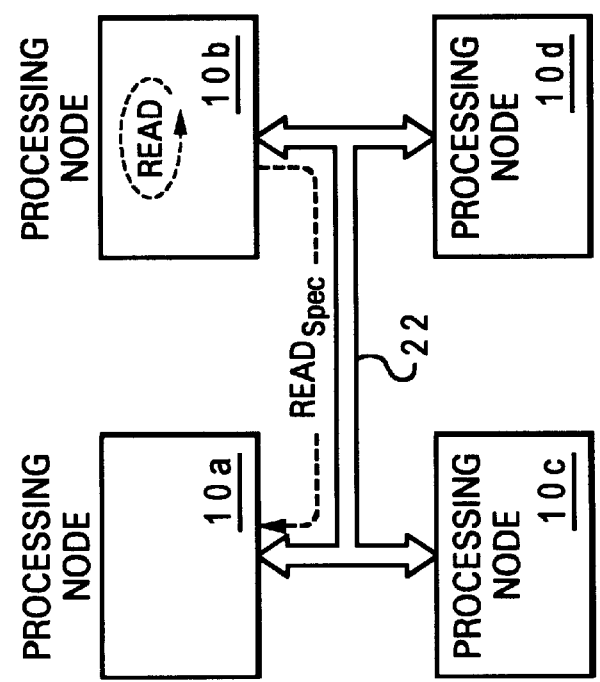

With reference now to FIGS. 3A and 3B, there is illustrated a first exemplary inter-node communication scenario in which a requesting processing node 10 speculatively issues a read request for a cache line that is not modified at requesting processing node 10. As shown in FIG. 3A, a processor 12 in processing node 10b issues a read request for a cache line having processing node 10a as the home node. Node controller 20 of processing node 10b accordingly speculatively issues the read request to processing node 10a via node interconnect 22 with a AResp$_{speculative}$ coherency packet. Then, as depicted in FIG. 3B, when the request is issued on local interconnect 16 of processing node 10a, directory control logic 58 checks coherence directory 50 to determine if the requested cache line is indicated as Modified at requesting processing node 10b. Because the requested cache line is indicated to be in a state other than Modified, node controller 20 of processing node 10a retrieves the requested cache line from the local system memory 18 and supplies the requested cache line to node controller 20 of processing node 10b, which sources the requested cache line to the requesting processor 12.

Figure 4B:
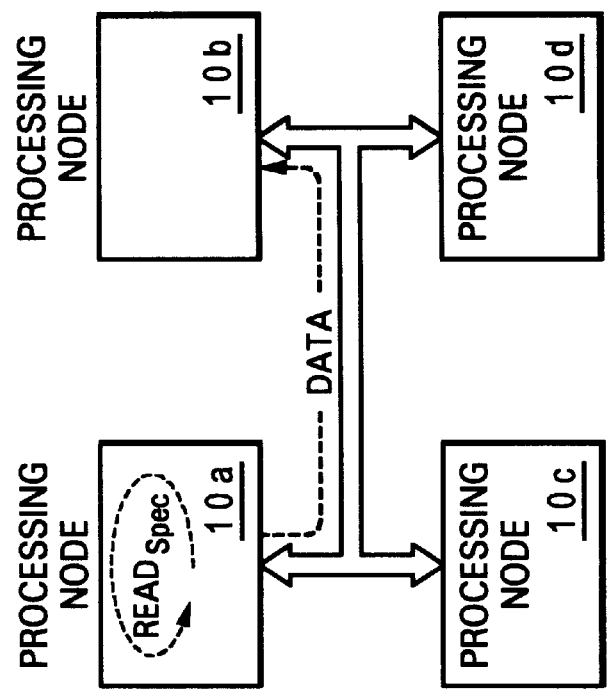
FIGS. 4A and 4B depict a second exemplary inter-node communication scenario in which the requesting processing node speculatively issues a read request that is subsequently retried at the requesting processing node.
Figure 4A:
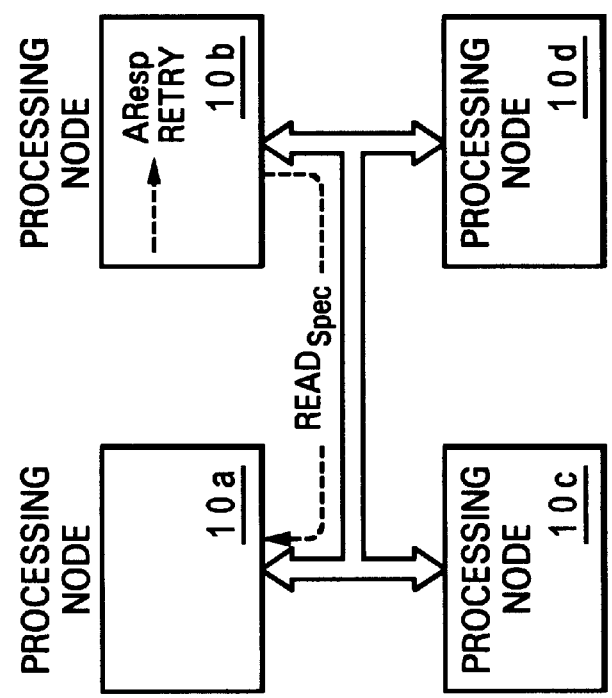

Referring now to FIGS. 4A and 4B, there is depicted a second exemplary inter-node communication scenario in accordance with the present invention. As illustrated in FIG. 4A, requesting processing node 10b speculatively issues a read request to processing node 10a that is subsequently retried at processing node 10b. In response to the Retry ARespIn vote, TSU 42 at processing node 10b sets the state of the transaction in pending buffer 60 to Null and sends a Kill command to DRU 44. As shown in FIG. 4B, TRU 40 of processing node 10a responds to the speculative read request by sourcing a read request on its local interconnect 16. In response to this local read request, a determination is made with reference to coherence directory 50 that the requested cache line is not modified, and the requested cache line is retrieved from system memory 18 at processing node 10a and sourced to processing node 10b via node interconnect 22 along with a Null AResp vote. In response to receipt of the requested cache line, the transaction is purged from pending buffer 60, and the requested cache line is discarded by DRU 44 as a result of the earlier issued Kill command.

Figure 5B:
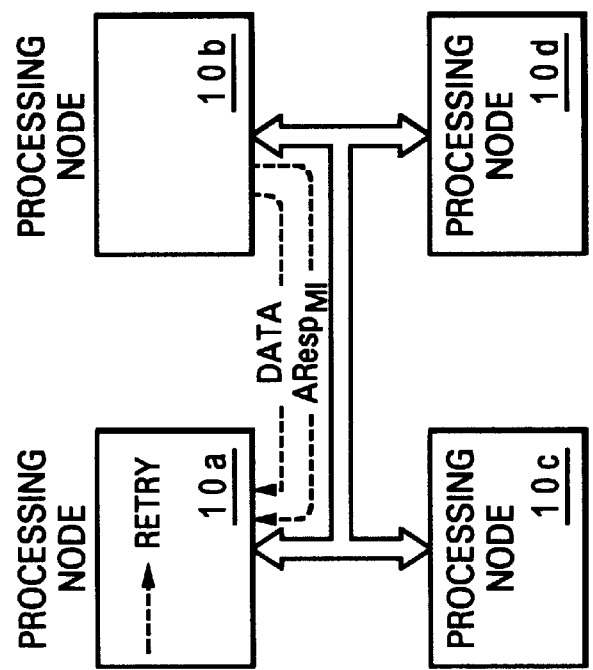
FIGS. 5A and 5B illustrate a third exemplary inter-node communication scenario in which the requesting processing node speculatively issues a read request for a cache line that is modified at the requesting processing node.
Figure 5A:
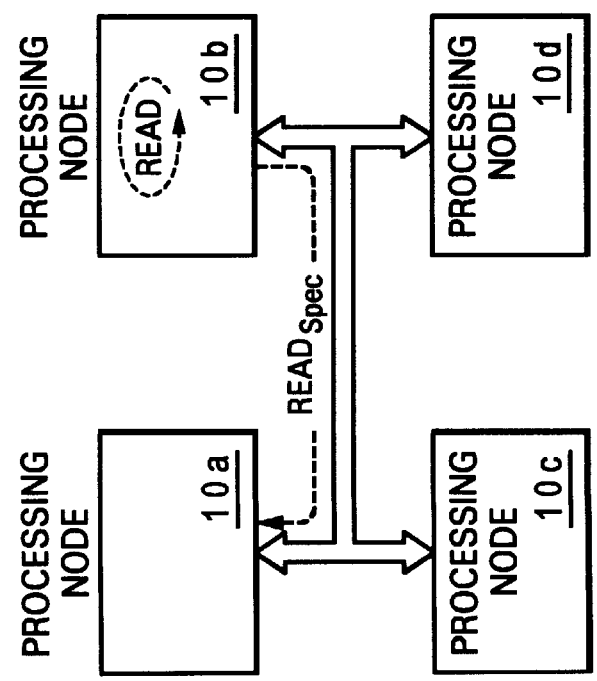

With reference now to FIGS. 5A and 5B, there is illustrated a third exemplary inter-node communication scenario in accordance with the present invention. As shown in FIG. 5A, a processor 12 in processing node 10b issues a read request for a cache line that is modified at processing node 10b and has processing node 10a as the home node. Node controller 20 of processing node 10b speculatively issues the read request to processing node 10a via node interconnect 22 with a AResp$_{speculative}$ coherency packet. As shown in FIG. 5B, following the speculative issue of the read request on node interconnect 22, the read request receives a Modified Intervention ARespIn vote at requesting processing node 10b that is forwarded to processing node 10a. In response to the Modified Intervention coherency response, TSU 42 at processing node 10b transmits a Send command to DSU 46. Meanwhile, node controller 20 at processing node 10a issues the speculative read request on its local interconnect 16. TSU 42 will give a Retry ARespOut vote for the local read request since coherence directory 50 indicates that the requested cache line may be modified at requesting processing node 10b. TRU 40 will continue to reissue the read request and TSU 42 will continue to Retry the read request until the Modified Intervention AResp vote is received from processing node 10b. At that point, the read request will complete normally with TSU 42 voting Modified Intervention during the ARespOut period. DRU 44 of processing node 10a then receives the modified cache line from processing node 10b and utilizes the modified cache line to update its system memory 18.

As has been described, the present invention provides an improved NUMA computer system and an improved communication methodology in a NUMA computer system. In accordance with the present invention, communication transactions are speculatively issued to a remote processing node via the node interconnect prior to the completion of the communication transaction on the local interconnect of a source processing node. In this manner, the latency of inter-node communication transactions can be dramatically reduced.

While the invention has been particularly shown and described with reference to a preferred embodiment, it will be understood by those skilled in the art that various changes in form and detail may be made therein without departing from the spirit and scope of the invention.

What is claimed is:

1. A computer system, comprising:

a node interconnect; and at least a first processing node and a second processing node that are each coupled to said node interconnect, said first and said second processing nodes each including a local interconnect, a processor coupled to said local interconnect, a system memory coupled to said local interconnect, and a node controller interposed between said local interconnect and said node interconnect, said node controller of said second processing node having a directory that records remote states of data from the system memory of the second processing node which are held at other processing nodes, wherein the node controller of said first processing node, responsive to receipt of a request transaction including an address on said local interconnect of said first processing node, decodes said address to identify said second processing node as a target and then speculatively transmits said request transaction to said second processing node via said node interconnect prior to receipt of a local combined coherency response, wherein said node controller of said second processing node handles said speculatively transmitted request transaction according to a state in said directory of a datum identified by said address.

2. The computer system of claim 1, wherein said node controller of said first processing node handles a request transaction following speculative transmission of said request transaction in response to said local combined coherency response to said request transaction at said first processing node.

3. The computer system of claim 2, said node controller of said first processing node including means for forwarding, to said second processing node, said local combined coherency response.

4. The computer system of claim 3, said node controller of said second processing node including means for handling said speculatively transmitted request transaction in accordance with said forwarded local combined coherency response.

5. The computer system of claim 1, wherein said speculatively transmitted request transaction comprises a read request.

6. The computer system of claim 1, wherein said node controller of said first processing node supplies said datum identified by said address to said second processing node if said datum is stored in said first processing node in a modified state.

7. The computer system of claim 1, wherein said node controller of said second processing node speculatively issues, on said local interconnect of said second processing node, said speculatively transmitted request transaction.

8. The computer system of claim 7, wherein said node controller of said second processing node forces said request transaction speculatively issued on said local interconnect of said second processing node to be retried if said datum specified by said request transaction has a directory state indicating that said datum could be modified at said first processing node.

9. A method of communication in a computer system including a node interconnect that couples at least first and second processing nodes, said method comprising:

in response to receipt, at a node controller of the first processing node, of a request transaction from a local interconnect within said first processing node, said request transaction specifying a datum by an address, decoding said address to identify said second processing node as a target and then speculatively transmitting said request transaction to said second processing node via said node interconnect prior to receipt of a local combined coherency response;

maintaining, within the directory at said second processing node, directory states for selected addresses in a system memory at said second processing node, wherein said selected addresses are addresses for which associated data are stored at one or more processing nodes other than said second processing node; and handling said speculatively transmitted request transaction at said second processing node in response to a directory state of said datum recorded in the directory at said second processing node.

10. The method of claim 9, and further comprising:

following speculative transmission of said request transaction on said node interconnect from said first processing node to said second processing node, determining a local combined coherency response of said first processing node; and thereafter, handling said request transaction at said first processing node in response to said local combined coherency response.

11. The method of claim 10, and further comprising forwarding said local combined coherency response to said second processing node.

12. The method of claim 11, and further comprising handling said speculatively transmitted request transaction at said second processing node in accordance with said local combined coherency response forwarded from said first processing node.

13. The method of claim 9, wherein said speculatively transmitted request transaction is a read request.

14. The method of claim 9, and further comprising supplying said datum to said second processing node if said datum is stored in said first processing node in a modified state.

15. The method of claim 9, and further comprising speculatively issuing said request transaction on a local interconnect within said second processing node.

16. The method of claim 15, and further comprising forcing said request transaction speculatively issued on said local interconnect of said second processing node to be retried if said datum has a directory state indicating that said datum could be modified at said first processing node.

* * * * *